Patented July 5, 1938

2,122,644

UNITED STATES PATENT OFFICE 2,122,644

PROCESSES OF PREPARING HIGH MOLECULAR WEIGHT PRIMARY AMINES

James Harwood, Chicago, Ill., assignor to Armour and Company, Chicago, Ill., a corporation of Illinois No Drawing. Application October 8, 1936, Serial No. 104,708

14 Claims. (Cl. 260—127)

This invention relates to processes of preparing high molecular weight primary amines and it comprises processes wherein the nitrile of a higher fatty acid is reduced with metallic sodium and an alcohol in the presence of toluene as an inert solvent or diluent for the reactants.

The high molecular weight primary aliphatic amines are substances of increasing technical importance since from them many organic compounds of great value in the arts can be prepared. By "high molecular weight primary aliphatic amines" I mean those amines containing at least six carbon atoms in the molecule. I do not intend to embrace within the present invention the preparation of the lower primary amines, such as ethyl, propyl, and butyl amines, because there are relatively few difficulties encountered in the preparation of these substances and processes which are satisfactory and have already been described. The higher aliphatic amines, however, present many problems in their preparation. In the first place, sources of the alkyl radical thereof are quite limited. Of the few sources available, the fats and fatty acids are the most attractive. These raw materials are available in huge quantities and at low prices. The problem has been to devise a satisfactory method whereby the carboxylic acid group attached to the long chain alkyl groups in such fatty acids could be converted to an amino group. Having solved this problem, many ways are available for preparing wetting out agents, detergents and other valuable materials from the primary amines.

Recently, processes have been described for converting higher fatty acids to their corresponding nitriles. Thus, for example, caprylic acid can be converted to caprylonitrile, lauric acid can be converted to lauronitrile and stearic acid can be made to yield stearonitrile. Moreover, the high molecular weight nitriles, such as stearonitrile, nitriles derived from lard fatty acids (containing oleic acid and yielding nitriles of oleic acid) and others can be cracked to give nitriles of lower molecular weight and having six, seven, eight, nine and ten carbon atoms in the molecule.

These recent developments in the preparation of nitriles of higher fatty acids have opened up a vast new field. The fats and fatty acids are cheap and abundant, and methods of forming nitriles therefrom are not at all costly.

In consequence of the availability of the nitriles of higher fatty acids, namely those having at least six carbon atoms in the molecule, including that carbon atom in the CN group, I have investigated methods of reducing such nitriles to their corresponding amines. At first glance, the reduction of a nitrile to its primary aliphatic amine would seem to offer the most promising way of preparing the higher amines, and, indeed, the literature describes methods which purport to be satisfactory. These methods are of two types. The first consists in the vapor phase reduction of the nitrile with gaseous hydrogen, advantageously in the presence of a catalyst. While this method will yield "amines", the reaction product is always a mixture of primary and secondary amines, and yields of the primary are so poor that the method is of no value commercially. The second general type of reaction consists in reducing the nitrile in liquid phase with sodium and an alcohol, and there are isolated instances advocating this method. On its face, it would appear to be commercially practical. However, the large excess of sodium and alcohol required makes this reaction quite inefficient and of very questionable commercial application.

Despite the obvious inference that any sodium reduction method would be unsatisfactory, I have investigated this reaction in the hope that the amount of sodium and alcohol required could be substantially reduced for the preparation of primary amines from nitriles. By modifying the method, I have also been able to obtain yields of primary amines closely approaching theoretical. And I have been able to do this without using the great excess of sodium, hitherto considered as unavoidable.

I have discovered that the amount of sodium and alcohol can be reduced to essentially stoichiometric proportions if the reaction takes place in the presence of toluene and that nearly quantitative yields of primary amines result. The toluene makes it possible to keep the sodium in a fine state of division so that the nitrile-alcohol mixture can be added directly to the sodium suspension. This avoids the loss of sodium due to reaction with the alcohol and subsequent evolution of hydrogen gas which does not enter into the reaction. The reaction is, therefore, easily controllable and proceeds rapidly, distinguishing it from the other method which is initially very violent but requires long heating for completion.

In broad aspects then, the process of the present invention comprises treating an aliphatic nitrile having at least six carbon atoms with sodium and a suitable aliphatic alcohol in the presence of toluene. The alcohol reactant is, of course, any of the alcohols customarily used in conjunction with sodium for reduction purposes. These alcohols are, for example, ethyl, propyl, and butyl, and also the secondary and tertiary alcohols. I make no claim to any unusual behavior of a particular alcohol, and my invention does not lie in the choice of a particular alcohol. As stated, my invention relates to the sodium-alcohol method of reduction, but modified by the use of toluene as an inert solvent. More specifically, my invention comprises admixing sodium and toluene and adding thereto a toluene solution of the nitrile and alcohol.

My invention is, as stated, applicable to the conversion of all aliphatic nitriles having six or more carbon atoms to their corresponding amines. Consequently, it is applicable to the conversion of nitriles beginning with capro nitrile and running as high as stearonitrile. It is also applicable to the conversion of unsaturated nitriles such as oleonitrile, lard fatty acid nitriles (these being mixtures of oleo, palmito, and others), to the conversion of cracked nitriles obtained by cracking stearonitrile and palmitonitrile, and to the conversion of aliphatic nitriles either alone, or mixtures thereof, from any other source. It is especially applicable to the conversion of the cracked reaction products obtained from cracking stearo and palmitronitrile since these cracked mixtures contain around fifty percent of hydrocarbons and consequently no extraneous diluent or solvent is ordinarily necessary. The alcohol reactant can be added to the cracked mixture and the resulting solution added to the mixture of sodium and toluene.

When starting with mixtures of nitriles I obtain mixtures of primary aliphatic amines corresponding to the nitriles in the starting mixture. The reaction product can be fractionally distilled under low pressure to separate the individual amines. In many instances the mixture of primary amines can be used directly for the preparation of sulphonated products such as detergents, wetting out agents etc., without separation into individual constituents.

In the interests of brevity I shall restrict specific examples of my invention to the preparation of dodecylamine and octadecylamine. These two examples will indicate the process steps of my invention and from them those skilled in the art will be able to prepare primary aliphatic amines from other nitrile sources.

When preparing dodecylamine I first form a suspension of about 20 parts by weight of sodium in about 300 parts by weight of toluene. This suspension is heated to boiling under a reflux and to it I slowly add 36 parts by weight of lauronitrile, 65 parts by weight of normal butyl alcohol and 300 parts by weight of toluene. All of the above materials should be anhydrous, or nearly so, to conserve the sodium. After addition of the nitrile solution, I heat the reaction mixture to 60° C. over a period of about half an hour with stirring. The mixture takes on a jelly-like consistency, but it can be stirred without difficulty. The reaction now being completed I next add 300 parts by weight of water slowly. This decomposes the sodium alcoholate and reacts with an excess of sodium present. Then the mixture is acidified with a suitable acid, such as acetic or hydrochloric and the whole distilled to remove butyl alcohol and toluene. Thereupon the aqueous still residue is mixed with enough caustic soda solution to precipitate the amine which can be separated. I obtain a yield of 32 parts by weight which is about 90 percent of theory. The amine is pure dodecylamine boiling at 130–35° C. at 14 mm. pressure of mercury.

Octadecylamine is prepared in substantially the same way. Thus 53 parts by weight of stearonitrile, 65 parts by weight of normal butyl alcohol, and 300 parts by weight of toluene are added to a boiling mixture of 300 parts by weight of toluene containing about 20 parts by weight of sodium, and the reaction mixture worked up as described for dodecylamine. The yield of octadecylamine amounts to 50 parts by weight, or 93 per cent of theory.

As mentioned in the foregoing, any suitable alcohol can be used. I find it most advantageous to use normal butyl alcohol in conjunction with toluene since the boiling point range of this mixture is such that both can be driven from the reaction mixture readily. Ethyl alcohol can, of course, be employed, and those skilled in the art are fully aware of the various alcohols customarily used in conjunction with sodium in reduction processes of this general nature.

One of the most important advantages in my process, aside from high yields of primary amines, is in the fact that the amount of sodium required practically never exceeds ten percent over the theoretical. In all processes hitherto suggested using sodium, the amount of sodium has been in great excess, usually as much as 400 percent of theory. This large quantity has mitigated against the use of this reduction method commercially. Consequently, any process which conserves sodium is of economic significance. Other reactants, such as the alcohol and the toluene, can be recovered for reuse.

Having thus described my invention what I claim is:

1. In the process of reducing aliphatic nitriles having at least six carbon atoms with sodium and an alcohol, the step which comprises reacting the nitrile with the sodium and the alcohol while in the presence of toluence as an inert solvent for the nitrile and alcohol.

2. The process as in claim 1 wherein the nitrile is lauronitrile.

3. The process as in claim 1 wherein the nitrile is stearonitrile.

4. The process as in claim 1 wherein the nitrile is a mixture of lard fatty acid nitriles.

5. In the process of reducing aliphatic nitriles having at least six carbon atoms with sodium and an alcohol, the steps which comprise adding a toluene solution of the nitrile and the alcohol to a suspension of the sodium in toluene, and heating the reaction mixture to a moderately elevated temperature of about 60° C.

6. The process as in claim 5 wherein the nitrile is a mixture of lard fatty acid nitriles.

7. In the process of reducing aliphatic nitriles having at least six carbon atoms with sodium and butyl alcohol, the step which comprises reacting the nitrile with the sodium and butyl alcohol in toluene.

8. The process as in claim 7 wherein the nitrile is lauronitrile.

9. The process as in claim 7 wherein the nitrile is stearonitrile.

10. The process as in claim 7 wherein the nitrile is a mixture of lard fatty acid nitriles.

11. In the process of reducing aliphatic nitriles having at least six carbon atoms with sodium and butyl alcohol, the steps which comprise adding a solution of the nitrile and alcohol in toluene to a suspension of the sodium in toluene, and heating the reaction mixture to a moderately elevated temperature of about 60° C.

12. The process as in claim 11 wherein the nitrile is lauronitrile.

13. The process as in claim 11 wherein the nitrile is stearonitrile.

14. The process as in claim 11 wherein the nitrile is a mixture of lard fatty acid nitriles.

JAMES HARWOOD.